(12) United States Patent
Sabram

(10) Patent No.: US 7,580,695 B2
(45) Date of Patent: Aug. 25, 2009

(54) POWER MANAGEMENT FOR A HANDHELD MEASUREMENT SYSTEM

(75) Inventor: Stephen R. Sabram, Campbell, CA (US)

(73) Assignee: Datastick Systems, Inc., Campbell, CA (US)

( * ) Notice: Subject to any disclaimer, the term of this patent is extended or adjusted under 35 U.S.C. 154(b) by 586 days.

(21) Appl. No.: 11/295,958

(22) Filed: Dec. 6, 2005

(65) Prior Publication Data

US 2007/0129118 A1  Jun. 7, 2007

(51) Int. Cl.
    *H04B 1/16* (2006.01)
(52) U.S. Cl. .............. 455/343.1; 455/343.2; 455/343.5; 455/556.2; 455/572; 340/635; 340/586
(58) Field of Classification Search .............. 455/343.1, 455/343, 2, 343.5, 556.2, 572, 575.1, 347; 340/635, 586
    See application file for complete search history.

(56) References Cited

U.S. PATENT DOCUMENTS

| | | | |
|---|---|---|---|
| 5,184,500 A * | 2/1993 | Krcma et al. ................. 73/23.2 |
| 5,744,266 A * | 4/1998 | Nunome et al. .............. 429/224 |
| 6,088,730 A * | 7/2000 | Kato et al. ................... 709/227 |
| 6,336,142 B1 * | 1/2002 | Kato et al. ................... 709/227 |
| 6,411,572 B1 * | 6/2002 | Hock ....................... 369/32.01 |
| 7,363,519 B2 * | 4/2008 | Liebenow .................... 713/300 |
| 7,386,276 B2 * | 6/2008 | Sama et al. ................. 455/41.3 |
| 2004/0126814 A1 * | 7/2004 | Singh et al. ................... 435/7.1 |
| 2005/0033603 A1 * | 2/2005 | Suzuki et al. ................... 705/2 |
| 2005/0273330 A1 * | 12/2005 | Johnson ....................... 704/246 |
| 2006/0143483 A1 * | 6/2006 | Liebenow .................... 713/300 |
| 2007/0088553 A1 * | 4/2007 | Johnson ....................... 704/257 |
| 2007/0124144 A1 * | 5/2007 | Johnson ....................... 704/246 |

* cited by examiner

*Primary Examiner*—Matthew D Anderson
*Assistant Examiner*—Minh D Dao
(74) *Attorney, Agent, or Firm*—Philip T. Virga

(57) ABSTRACT

A method and system suitable for managing the power consumption of a handheld measurement system that combines a handheld computer, measurement sled, and sensors is provided. The handheld computer performs timing operations for sensor warm up and also shutting down the sensor power during a period of user inactivity after no measurements are being acquired. Additionally, the sled's firmware, implements simple sensor power on and off commands in response to the user.

17 Claims, 5 Drawing Sheets

US 7,580,695 B2

POWER MANAGEMENT FOR A HANDHELD MEASUREMENT SYSTEM

CROSS-REFERENCE TO RELATED APPLICATIONS

Attention is directed to co-pending application U.S. application Ser. No. 11/296,520, filed Dec. 5, 2005, entitled, "Graphical Architecture for Handheld Measurement System". The disclosure of this co-pending application is hereby incorporated by reference in its entirety.

FIELD OF THE INVENTION

This invention relates generally to handheld measurement devices and, in particular, to the power management of handheld measurement devices.

BACKGROUND

A typical handheld measurement system consists of software and simple hardware attachments for a given PDA (personal digital assistant) such as the Palm. Sensors are attached to the hardware, turning the Palm handheld into a state-of-the-art, handheld test and measurement instrument. By using the PDA or Palm handheld as a measurement device there is an increase in the amount of time the Palm handheld is in use. This places an ever-increasing demand on the amount of time the handheld devices are able to provide functionality between rechargings or repowerings.

Currently the most effective way of conserving power, and thereby extending the amount of time a handheld measurement device may be used, is simply turning the device off. The problem with this is that it also reduces the effectiveness of the device's measurement capability when monitoring sensors when the user is away. In cases, as mentioned above, where the handheld measurement device has additional functionality this functionality cannot be used when the device is off. In addition, turning the device on requires an additional power draw, above the usual operational power consumption of the device, which serves to further reduce the power reserves of the device.

Consequently, a need exists for power management on handheld measurement devices that reduces the power consumption of the device while retaining at least some of the functionality of the device.

SUMMARY

The present invention provides a method and system suitable for managing the power consumption of a handheld measurement system that combines a handheld computer, measurement sled, and sensors. The handheld computer performs timing operations for sensor warm up and also shutting down the sensor power during a period of user inactivity after no measurements are being acquired. Additionally, the sled's firmware, implements simple sensor power on and off commands in response to the user.

Other features and advantages will be apparent to one skilled in the art given the benefit of the following disclosure.

DETAILED DESCRIPTION OF THE DRAWINGS

Figure 1:
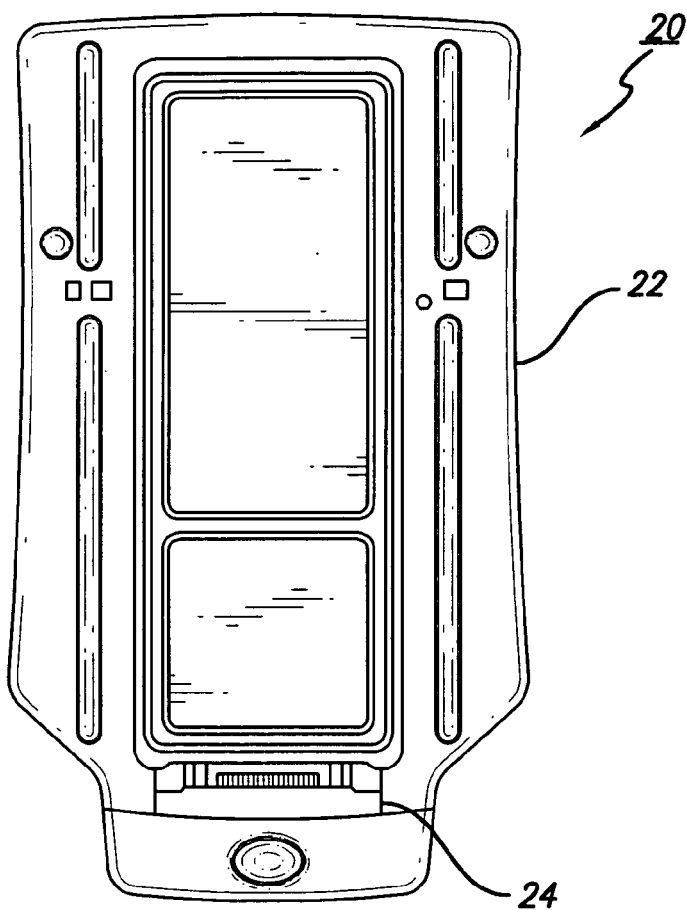
FIG. 1 is a plan front view of a measurement sled of the present invention.
Figure 2:
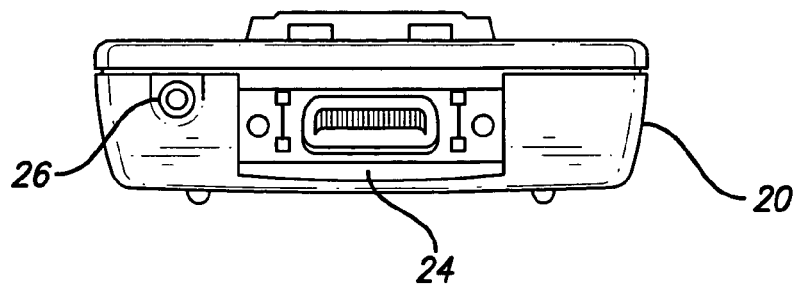
FIG. 2 is a side view of the measurement sled of FIG. 1.
Figure 3:
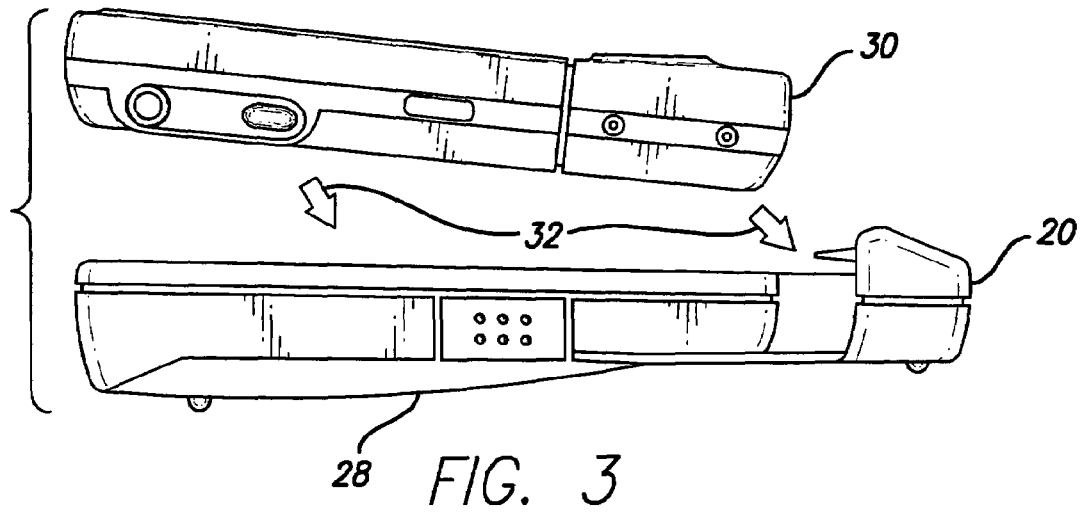
FIG. 3 is a planar side view illustrating the measurement sled attaching to a PDA.
Figure 4:
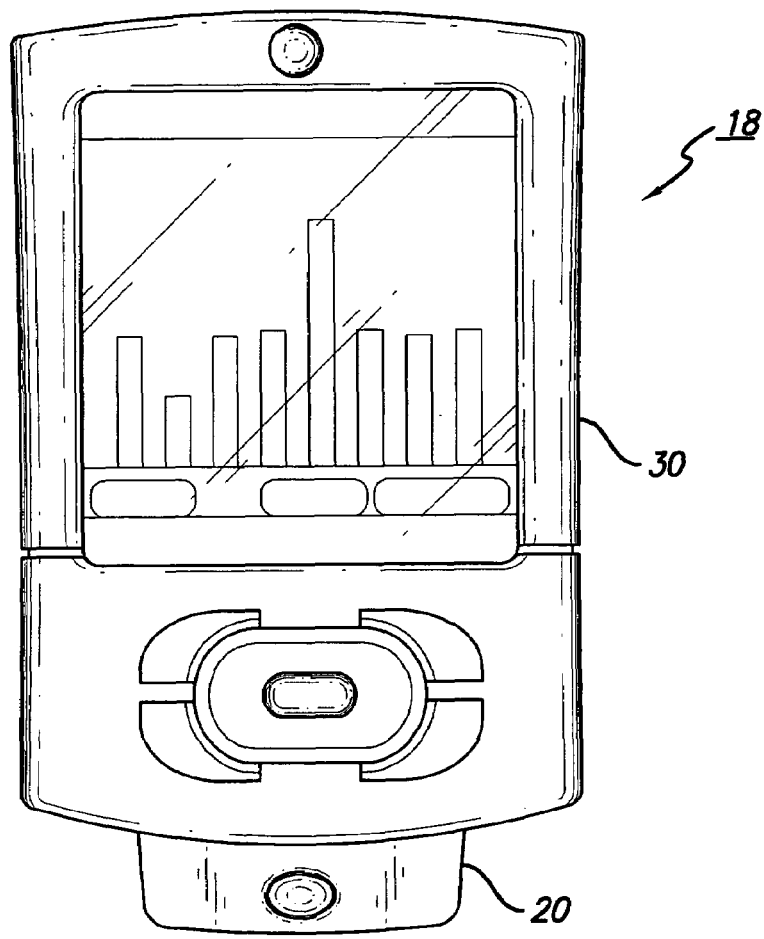
FIG. 4 is a plan front view of a PDA with the measurement sled connected and attached underneath forming a handheld measurement system.

Most PDAs (personal digital assistants) have the ability to have a "sled" attached to the bottom/back of the device. Typically, a sled is used for a wired or wireless communications device such as a modem or Ethernet connection. Referring to FIGS. 1 through 4 there is shown a small, lightweight peripheral or sled 20 that attaches securely to the back of a PDA device 30 which by way of example may be a Palm handheld. When combined with the software of the present invention, the appropriate cable, and environmental sensors such as a user's ICP® accelerometers for example, it becomes the first complete, PDA-based multipurpose instrument 18 for vibration analysis and analog data acquisition for ICP accelerometers and other sensors, as shown in FIG. 4. By adapting a stock plastic case and placing inside a micro-controller-based, analog-to-digital converter system to which sensors are attached an entire measurement system combining PDA, sled, and sensors provide for a wide range of test and measurement applications.

Although not shown in the figures, it should be understood that the design approach is to use a "split board" design within the sled wherein one end of the board is the "logic board," which holds the micro-controller or DSP (digital signal processor) and communicates with the PDA. The other end of the board is the "interface board," which holds the analog or digital electronics to communicate with the sensors. Although the boards are fabricated as one, they are designed so that the two ends can be cut apart and rejoined with multi-contact connectors. This allows for the possibility of new logic-board designs and/or new interface-board designs being created and joined with existing designs while minimizing design, fabrication, and assembly time and costs.

Referring once again to FIGS. 1 through 4, the measurement sled 20 may provide from four to eight single-ended analog inputs and provides one 16-bit digital counter, one TTL-level digital-switch input line, and two TTL-level digital-switch output lines. As shown in FIGS. 3 and 4, the measurement sled 20 firmly attaches and de-attaches to any Palm™ Tungsten™ T, T2, T3 30, or C or Garmin iQue 3200 or iQue 3600 handheld by utilizing mechanical hooks 22 and hook releases 28. High-impedance inputs ensure compatibility with almost any active analog sensor. An integrated 20-pin connector 24 features a harpoon latch for a more secure connection and is shielded for low noise. The measurement sled 20 may be powered by a pair of on-board AAA alkaline batteries (not shown) or by an optional external power supply through power connector port 26 as shown in FIG. 2.

Figure 5:
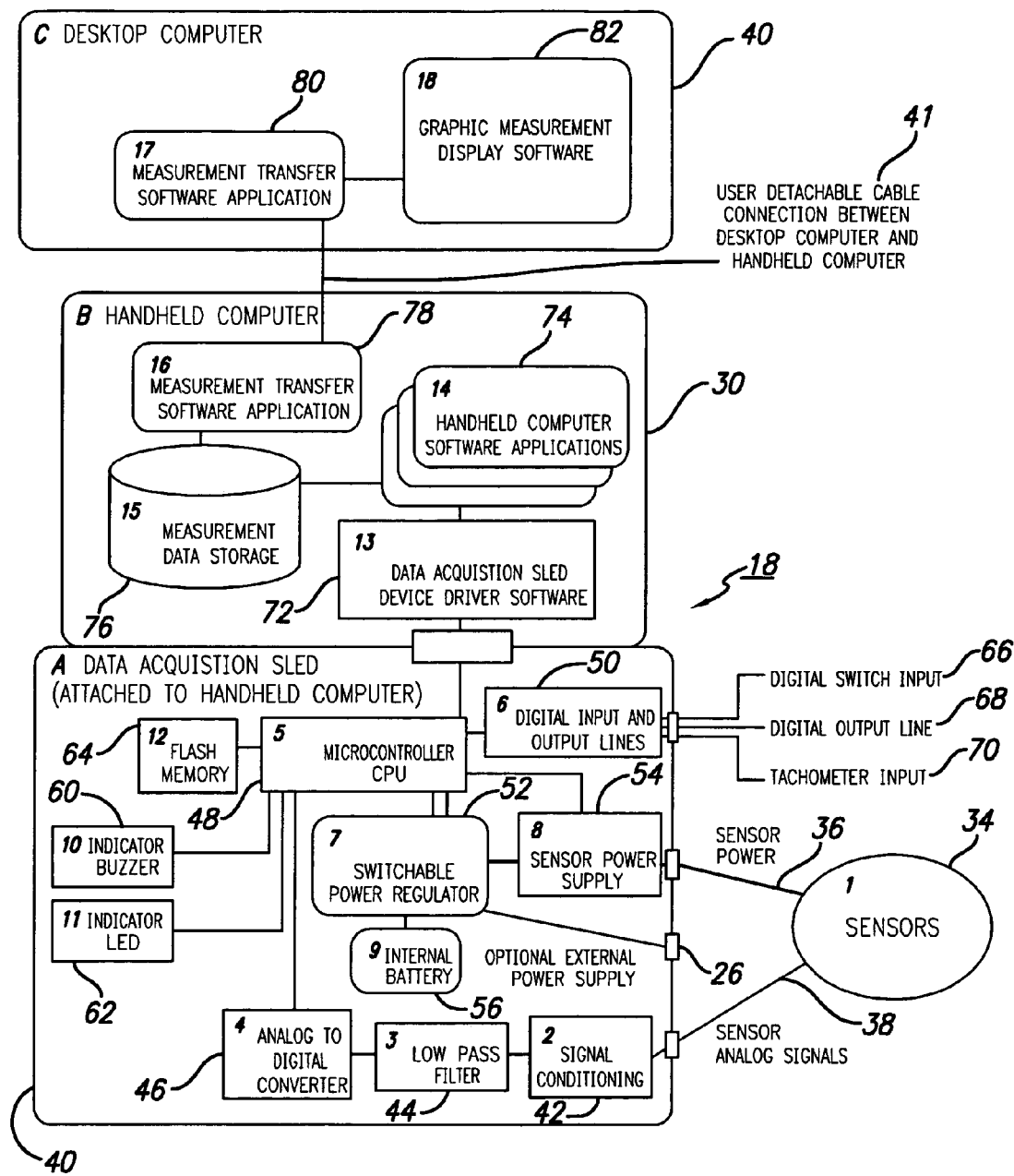
FIG. 5 illustrates a system level block diagram of the handheld measurement system connected to a desktop computer.

FIG. 5 illustrates a system level block diagram of the PDA sled-based instrumentation architecture 18 connected to a desktop computer 40. Overall, the object of the systems architecture is to utilize a handheld computer 30 to read and store sensor readings using a larger desktop or laptop computer 40 as a "post collection" tool to reduce the weight of equipment used in portable instruments. The architecture 18 also lets the measurements be moved from the handheld computer 30 to the desktop computer 40 for display. A step-by-step description of this process follows.

General-purpose sensors 34 such as pressure, acceleration, temperature and humidity are connected to the data acquisition or measurement sled 20. These sensors 34 connect electrically as sensor analog signals 38 to the sled 20 where the sensors' measurement electrical characteristics are converted into a readable voltage via signal conditioning 42. The conditioned signal is then moved through a low pass filter 44 that may be utilized as an anti-alias filter to remove false signals. This now conditioned and filtered signal is read by an analog to digital converter 46 that is controlled by the sled's 20 primary micro-controller 48. The micro-controller 48 reads the digitized signal and performs signal processing such as time-average filtering, signal linearization, digital filtering and even a Fast Fourier Transform. Once these signal-processed readings are made by the micro-controller 48, the signals are stored in one of two ways. They are either stored within the sled's 20 internal flash memory 64 that allows for high speed measurements (in the kilohertz) or sent to a data acquisition sled device driver software 72 and stored in the handheld computer 30.

The micro-controller 48 also drives an indicator buzzer 60 and an indicator LED 62 that may be used for operational cues to the user of the handheld computer 30. These cues are messages such as resetting of the firmware, connection or disconnection of communications to the handheld computer 30 or completion of a major operation in the firmware such as a specific mathematical transform upon sensor signals.

Turning once again to FIG. 5 the sled 20 is powered in two ways. Primarily, an internal battery 56 powers the micro-controller 48, signal conditioning and, optionally, the sensors 34. The sensors 34 are powered by a specific sensor power supply circuit 54 that is controlled by a switchable power regulator 52. The switchable power regulator 52 in turn is controlled by the micro-controller 48. In those instances when a sensor is not powered directly by the sled 20, the sensors power can be controlled by a digital output line 68 via a digital input and output lines controller 50. These digital IO lines (digital switch input 66 and digital output lines 68) may be used in many ways. One feature that has shown to have a significant advantage is the implementation of a tachometer input 70 that can be read along with the connected analog sensors 34.

The handheld computer 30 runs various handheld computer software applications 74, which directly interface with the data acquisition sled driver software 72 that in turn communicates with the sled 20. These handheld computer software applications 72 can both display and store measurements read from the data acquisition or measurement sled 20. The measurements are stored in persistent measurement data storage 76 volumes that are either internal to the handheld computer 30 or removable by the user. The measurement data held in the measurement data storage 76 is moved to a desktop or laptop computer 40 in one of two ways. One way is, if the measurement data storage 76 is a removedable media connected to the handheld computer 30, the removable media can be physically detached from the handheld computer 30 and then attached to the desktop or laptop computer 40. The second way, which is the most common, is to connect the handheld computer to the desktop computer via a user detachable cable 41. This cable 41 lets the measurement transfer software applications 78 of the handheld computer 30 and the desktop computer 40 to communicate with each other and starts the transfer of measurement data from the handheld computer 30 to the desktop computer 40.

Once the measurement data is transferred to the desktop computer, graphic measurement display software 82 reads the measurement files now stored on the desktop or laptop computer 80 for text and graphical display. At this point, the user now can further manipulate the measurement data with user provided software for their specific task. While many aspects of the sled 20 exist in other third party products, a novel and effective power management for the data acquisition hardware sled 20 is provided. This is mostly done with the handheld computer 30 supervising the timing of the sled's sensor power 36 instead of it being directly controlled by the sled's micro-controller 48 as is known in the art of power or battery management for handheld devices.

Figure 6:
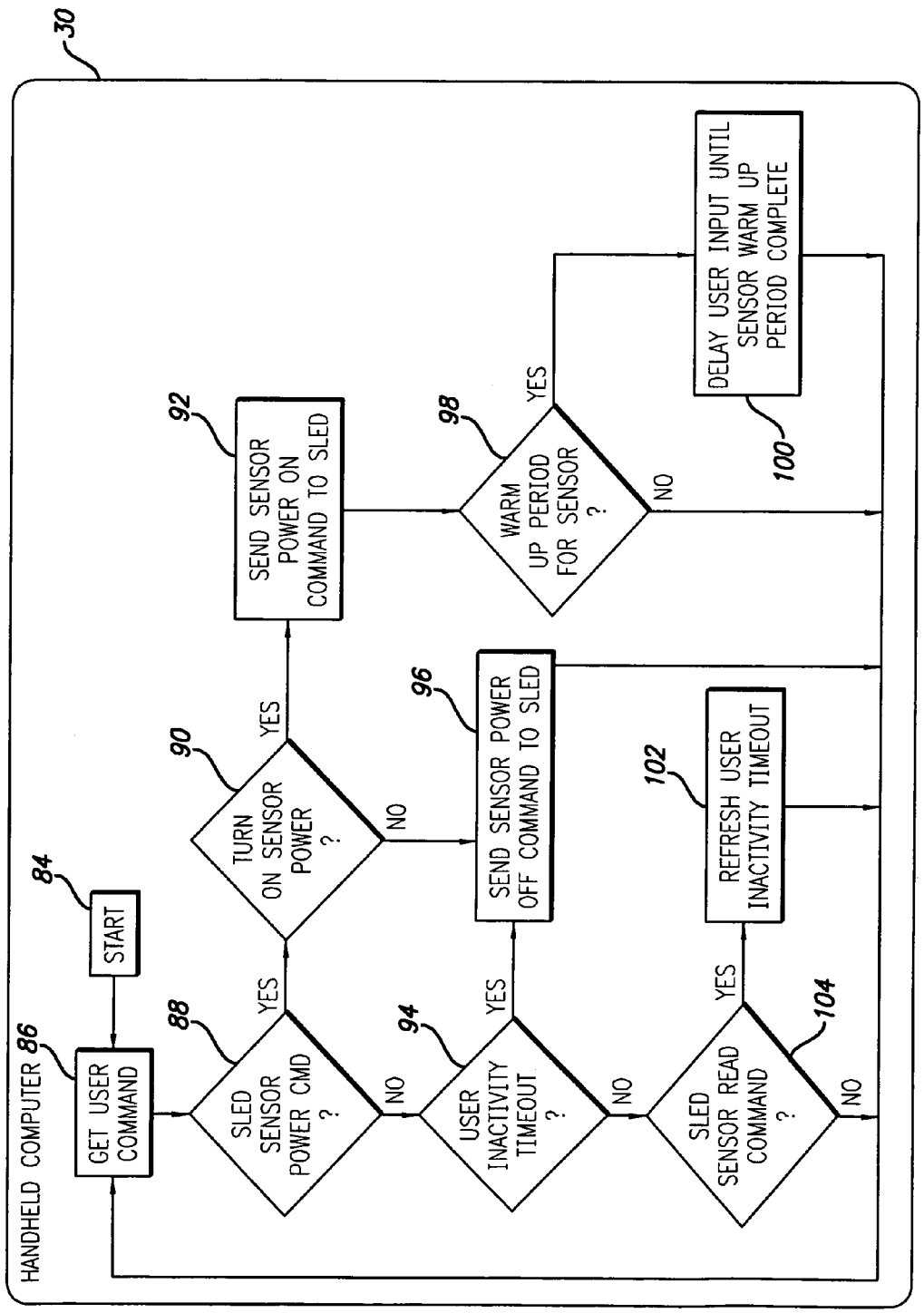
FIG. 6 is a flowchart illustrating one embodiment of a method for a power management routine utilized within the PDA.

FIG. 6 is a flowchart illustrating one embodiment of a method for a power management routine utilized within the handheld computer or PDA 30. The handheld computer when started 84 retrieves a user command 86 and determines initially if the user command is a sled sensor power command 88 for a given sensor. If a sled power sensor command is provided then it is determined to either turn on the sensor power or to leave it off 90. If the sensor is to be turned on, a power-on command is sent 92 to the sled. The power management routine then determines 98 if a warm up period is needed for the particular sensor. If a warm up period is required, user input is delayed until the sensor warm up period completes 100. The routine then retrieves the next user command 86. If it is however determined that the sled power command is to turn off the sensor 90, then a power-off command is sent 96 to the sled to turn off the sensor and the routine then retrieves the next user command 86. If no sensor power command is retrieved 88, then the routine determines 94 if a user inactivity timeout has occurred. If a user inactivity timeout has occurred, then a power-off command is sent 96 to the sled to turn off the sensor and the routine once again retrieves the next user command 86. If a timeout has not occurred 94, then the routine determines if a sled sensor read command has been sent 104. If a sled sensor read command was sent then the user inactivity timeout period is refreshed 102 and the next user command is retrieved 86. If a sensor read command was not sent, then the routine retrieves the next user command 86.

Figure 7:
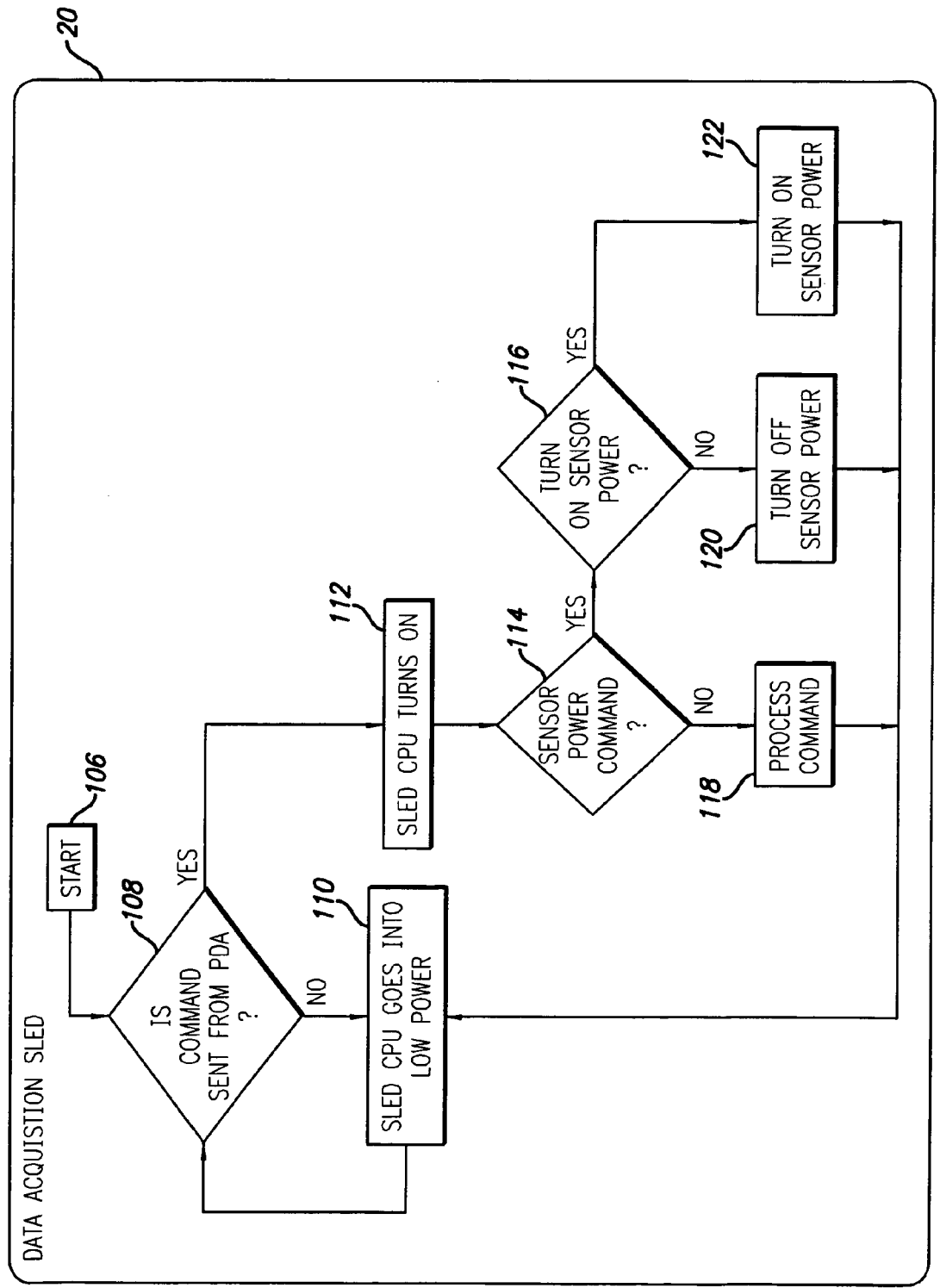
FIG. 7 is a flowchart illustrating one embodiment of a method for power management utilized within the measurement sled in association with the power management routine used by the PDA.

FIG. 7 is a flowchart illustrating one embodiment of a method for power management utilized within the measurement sled in association with any power management routine used by the handheld computer power management routine described above. The data acquisition sled when started 106 checks to see if a command has been sent 108 from the handheld computer or PDA. If no command has been sent, the sled's CPU goes into a low power mode 110 and checks again to see if a command has been sent. This cycle continues in low power mode until a command has been received. When a command is sent from the handheld computer, the sled's CPU is turned-on 112 and the command is checked to determine 114 if it is a sensor power command. If the command is not a sensor power command, the command is processed or performed 118 and the sled's CPU once again goes into low power mode 110 wherein the cycle continues in low power mode until a command has been received 108. If a sensor command however is received, the routine for the sled determines if the sensor power is to be turned-on 166 and either turns-on 122 or turns-off 120 the sensor depending on the command. The sled's CPU then goes into low power mode 110 until the next command is received.

The specific logic flow between the handheld computer and the data acquisition sled are shown with the handheld computer's logic flow shown above. The handheld computer performs timing operations for sensor warm up and also shutting down the sensor power during a period of user inactivity after no measurements are being acquired. Additionally, the sled's firmware, implements simple sensor power on and off commands in response to the user.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method for managing power consumption by a user in a handheld measurement system having a handheld computer connected to a measurement sled and one or more sensors, comprising:

retrieving user commands by performing timing operations by the handheld computer for determining when sensor warm up is required and for shutting down sensor power during a period of user inactivity when no measurements are being acquired, and determining if a command has been sent from the handheld computer to the sled wherein if a command has been sent then turning-on the sled's central processing unit and performing the command and if no command has been received placing the sled's central processing unit in a low power mode.

2. The method for managing power consumption by the handheld measurement system according to claim 1, further comprising: performing sensor power on and off commands by the sled in response to user commands.

3. The method for managing power consumption by the handheld measurement system according to claim 2, further comprising: determining if the command sent from the handheld computer turns on one or more sensors and if a command has been sent then turning-on the one or more sensors and if no command has been sent then turning-off the one or more sensors and placing the sled's central processing unit in a low power mode.

4. The method for managing power consumption by the handheld measurement system according to claim 3, further comprising: determining if a sled sensor read command has been received when the user inactivity timeout period has not occurred wherein if the sensor read command has been received then refreshing the user inactivity timeout and retrieving the next user command.

5. The method for managing power consumption by the handheld measurement system according to claim 1, further comprising: determining if a user inactivity timeout period has expired when no sled sensor command has been received from the user by the handheld computer and if the user inactivity timeout period has expired sending a sensor power-off command to the one or more sensors and retrieving the next user command.

6. The method for managing power consumption by the handheld measurement system according to claim 1, further comprising: determining if a sensor warm-up period is required to the command sent from the handheld computer which turns on one or more sensors and if a sensor warm-up period command has been sent then delaying user input until the sensor warm-up period completes and retrieving the next user command.

7. A method for managing power consumption by a user in a handheld measurement system having a handheld computer connected to a measurement sled and one or more sensors, comprising:

retrieving user commands by performing timing operations by the handheld computer for determining for shutting down sensor power during a period of user inactivity when no measurements are being acquired, and determining if a sensor warm-up period is required to the command sent from the handheld computer which turns on one or more sensors and if a sensor warm-up period command has been sent then delaying user input until the sensor warm-up period completes.

8. The method for managing power consumption by the handheld measurement system according to claim 7, further comprising: performing sensor power on and off commands by the sled in response to user commands.

9. The method for managing power consumption by the handheld measurement system according to claim 8, further comprising: determining if no command has been received from the handheld computer placing the sled's central processing unit in a low power mode.

10. The method for managing power consumption by the handheld measurement system according to claim 9, further comprising: determining if the command sent from the handheld computer turns on one or more sensors and if a command has been sent then turning-on the one or more sensors and if no command has been sent then turning-off the one or more sensors and placing the sled's central processing unit in a low power mode.

11. The method for managing power consumption by the handheld measurement system according to claim 7, further comprising: determining if a user inactivity timeout period has expired and sending a sensor power-off command to the one or more sensors.

12. The method for managing power consumption by the handheld measurement system according to claim 11, further comprising: determining if a sled sensor read command has been received when the user inactivity timeout period has not occurred wherein if the sensor read command has been received then refreshing the user inactivity timeout.

13. A system for managing power consumption by a user in a handheld measurement system having a handheld computer connected to a measurement sled and one or more sensors, comprising:

means for retrieving user commands by performing timing operations by the handheld computer for determining when sensor warm up is required and means for shutting down sensor power during a period of user inactivity when no measurements are being acquired, and means for determining if a command has been sent from the handheld computer to the sled wherein if a command has been sent then turning-on the sled's central processing unit and means for performing the command and if no command has been received placing the sled's central processing unit in a low power mode.

14. The system for managing power consumption by the handheld measurement system according to claim 13, further comprising: means for performing sensor power on and off commands by the sled in response to user commands.

15. The system for managing power consumption by the handheld measurement system according to claim 14, further comprising: means for determining if the command sent from the handheld computer turns on one or more sensors and if a command has been sent then turning-on the one or more sensors and if no command has been sent then turning-off the one or more sensors and means for placing the sled's central processing unit in a low power mode.

16. The system for managing power consumption by the handheld measurement system according to claim 15, further comprising: means for determining if a user inactivity timeout period has expired when no sled sensor command has been received from the user by the handheld computer and if the user inactivity timeout period has expired sending a sensor power-off command to the one or more sensors and retrieving the next user command.

17. The system for managing power consumption by the handheld measurement system according to claim 16, further comprising: means for determining if a sled sensor read command has been received when the user inactivity timeout period has not occurred wherein if the sensor read command has been received then means for refreshing the user inactivity timeout and retrieving the next user command.

* * * * *